H. SCHUMACHER.
STEERING GEAR FOR VEHICLES.
APPLICATION FILED JULY 31, 1912.

1,106,589.

Patented Aug. 11, 1914.

Witnesses:
W. Ray Taylor
Walter P. Geyer.

Inventor
Henry Schumacher
by Geyer & Popp
Attorneys

UNITED STATES PATENT OFFICE.

HENRY SCHUMACHER, OF BUFFALO, NEW YORK.

STEERING-GEAR FOR VEHICLES.

1,106,589.  Specification of Letters Patent.  Patented Aug. 11, 1914.

Application filed July 31, 1912. Serial No. 712,444.

*To all whom it may concern:*

Be it known that I, HENRY SCHUMACHER, a citizen of the United States, residing at Buffalo, in the county of Erie and State of New York, have invented new and useful Improvements in Steering-Gears for Vehicles, of which the following is a specification.

This invention relates to steering gears for vehicles of that character in which the axle arm or spindle supporting the steering wheel is pivotally mounted on the axle or axle body by means of a spherical knuckle or ball arranged on the axle and engaging with a correspondingly shaped socket in the rear end of the axle arm, and a vertical pivot pin extends through the axle arm and knuckle in line with the tread of the wheel. Such a steering gear is shown in Letters Patent of the United States No. 1,030,793 granted to myself June 25, 1912, and the present invention is an improvement on that type of steering gear.

The purpose of the present invention is to relieve the vertical pivot pin which connects the axle arm and axle from undue strains in a vertical direction to which the same is subjected while in use and to strengthen or reinforce the same so that breakage of the steering gear is not liable to occur under the severest usage or load to which the same may be subjected.

Figure 1:
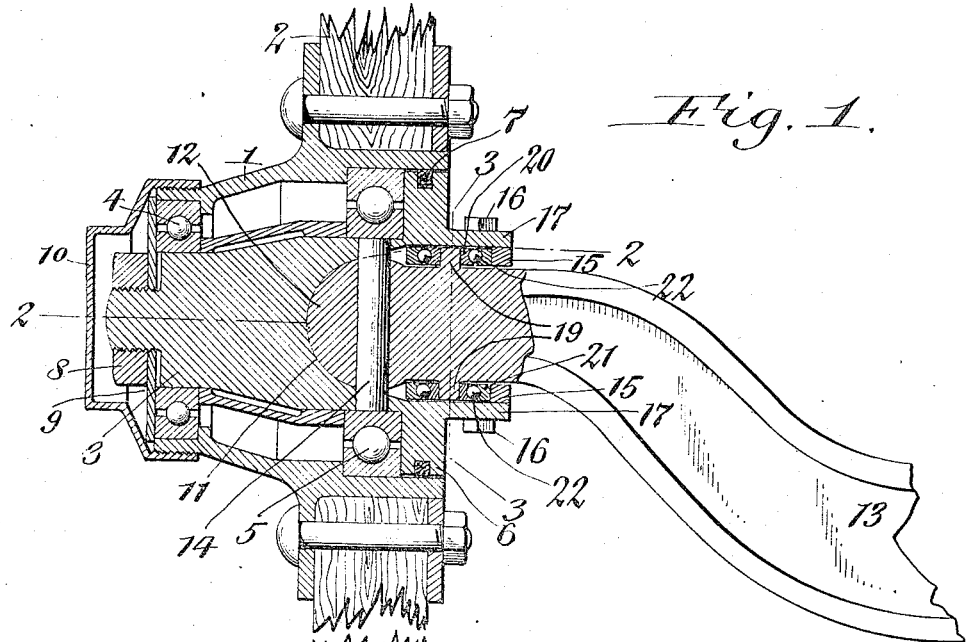
Figure 2:
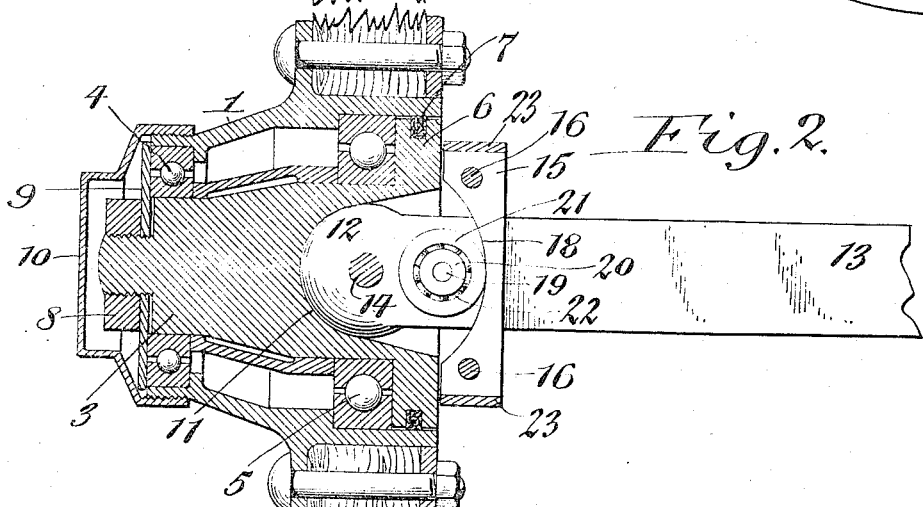
Figure 3:
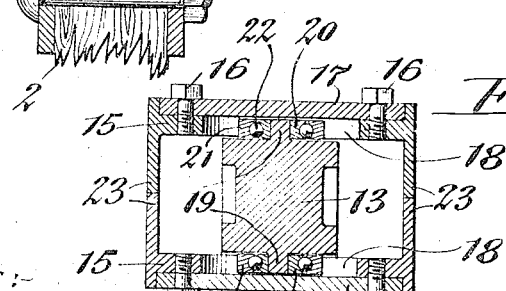

In the accompanying drawings: Figure 1 is a vertical longitudinal section of my improved steering gear applied to one of the front or steering wheels of an automobile and the adjacent part of the axle. Fig. 2 is a horizontal section thereof taken in line 2—2, Fig. 1. Fig. 3 is a vertical transverse section taken in line 3—3, Fig. 1.

Similar characters of reference indicate corresponding parts throughout the several views.

1 represents the tubular hub of the steering wheel and 2 the spokes thereof which parts may be of any suitable and well known construction.

3 represents the axle arm or spindle which forms part of the steering mechanism and upon the outer side of which the hub of the steering wheel is journaled by means of front and rear ball bearings 4, 5, as shown in Figs. 1 and 2 or by any other suitable means. The rear end of the axle arm may be provided with an external annular flange 6 which contains an annular packing ring 7 engaging with the bore of the hub at the rear end thereof for the purpose of excluding dust, dirt and water from the rear ball bearing. The hub is confined on the axle arm by a screw nut 8 and washer 9 arranged on the front end of the axle arm. Dust and dirt are excluded from the front ball bearing by means of a cap 10 applied to this end of the hub in the usual manner. At its rear end the axle arm is provided with a spherical socket 11 in which is seated a spherical knuckle or ball 12 arranged on the front end of the body or main portion of the steering axle 13. The axle arm and axle are pivotally connected with each other so as to permit the axle arm to turn horizontally relatively to the axle body by means which comprise a vertical pivot pin 14 extending centrally through the ball of the axle and the adjacent upper and lower parts of the axle arm, as shown in Figs. 1 and 2. In order to relieve this pivot pin from the shearing strains to which the same is subjected by a load which tends to tip the wheel in one direction or the other in a vertical plane parallel with the length of the axle and axle arm, reinforcing or strengthening means are provided which are preferably constructed as follows: 15 represents two abutment bars or rails arranged horizontally and transversely above and below the axle in rear of the axle arm and turning horizontally with the latter. These abutment bars are preferably made separate from the axle arm so that they may be renewed when worn out and for this purpose these abutment bars are detachably connected by means of screws 16 with the inner opposing sides of horizontal flanges 17 projecting rearwardly from the rear end of the axle arm, as shown in Figs. 1 and 3. Preferably on its front side each of these abutment bars is provided with a curved track or face 18 which is concentric with the pivot pin connecting the axle and axle arm. These curved faces of the abutment bars are engaged by thrust members mounted on the upper and lower sides of the axle in rear of the pivot pin. Each of these thrust members preferably consists of a fixed vertical thrust pin, stud or lug 19 formed integrally with the axle, an inner annular ball race 20 mounted on each of the thrust pins, a bearing ring or roller 21 engaging with the curved face of one of the abutment bars, and an annular row of balls 22 interposed between the bearing ring and the ball race. These thrust members therefore form rolling bearings or anti-friction rollers whereby the wheel is free to turn horizontally relatively to the axle but any tendency to tip the upper end of the wheel inwardly is resisted by the lower thrust roller and abutment bar and any tendency to tip the upper end of the wheel outwardly is resisted by the upper thrust roller and abutment bar. These thrust rollers and bars therefore supplement the main pivot pin 14 in keeping the wheel in an upright position and preventing the same from becoming strained, bent or broken under the load to which it may be subjected, thereby increasing the strength and safety of the wheel and the steering mechanism connecting the same with the axle.

For the purpose of minimizing the entrance of dust, dirt and water into the joint between the ball of the axle and the socket of the axle arm the opposite end of each abument bar is provided with vertical side plates 23 each of which engages at its outer end with the adjacent lateral edge of the companion supporting flange 17 while its inner end engages with the opposing end of the companion side plate on the corresponding end of the other supporting flange 17, as shown in Fig. 3. This arrangement of the side plates not only excludes dirt and dust to a certain extent from the ball joint but it also serves to strengthen the thrust resisting devices inasmuch as the abutment bars by this means reinforce one another.

I claim as my invention:

1. A steering gear for vehicles comprising an axle, an axle arm pivoted on said axle to turn horizontally, a wheel journaled on the axle arm, and a thrust bearing interposed between said axle and axle arm in rear of the pivotal connection between said axle and axle arm and operating to resist tipping of the wheel vertically lengthwise of the axle and axle arm, comprising an abutment fixed on the rear part of the axle arm and having a curved face which is concentric with the pivotal connection between the axle and axle arm and a thrust member comprising a stud arranged on the axle, a ball race arranged on the stud, a roller engaging said curved face, and a row of balls interposed between said ball race and roller.

2. A steering gear for vehicles comprising an axle, an axle arm pivoted on said axle to turn horizontally, a wheel journaled on the axle arm, and a thrust bearing interposed between said axle and axle arm in rear of the pivotal connection between said axle and axle arm and operating to resist tipping of the wheel vertically lengthwise of the axle and axle arm, comprising horizontal transverse flanges arranged on the rear end of the axle arm above and below the axle, upper and lower abutment bars secured to the opposing inner sides of said flanges, respectively, and each provided at its opposite ends with vertical side plates each of which bears at its outer end against the adjacent end of the corresponding flange while its inner end bears against the corresponding inner end of the companion side plate of the other abutment bar, and upper and lower rollers arranged on the upper and lower sides of the axle and engaging respectively with the upper and lower abutment bars.

Witness my hand this 29th day of July, 1912.

HENRY SCHUMACHER.

Witnesses:
L. BRADLEY DORR,
FRANK R. SCHUMACHER.